June 23, 1936.    H. J. CRINER    2,044,835
BREAD SLICING MACHINE
Filed Feb. 16, 1931    3 Sheets-Sheet 1
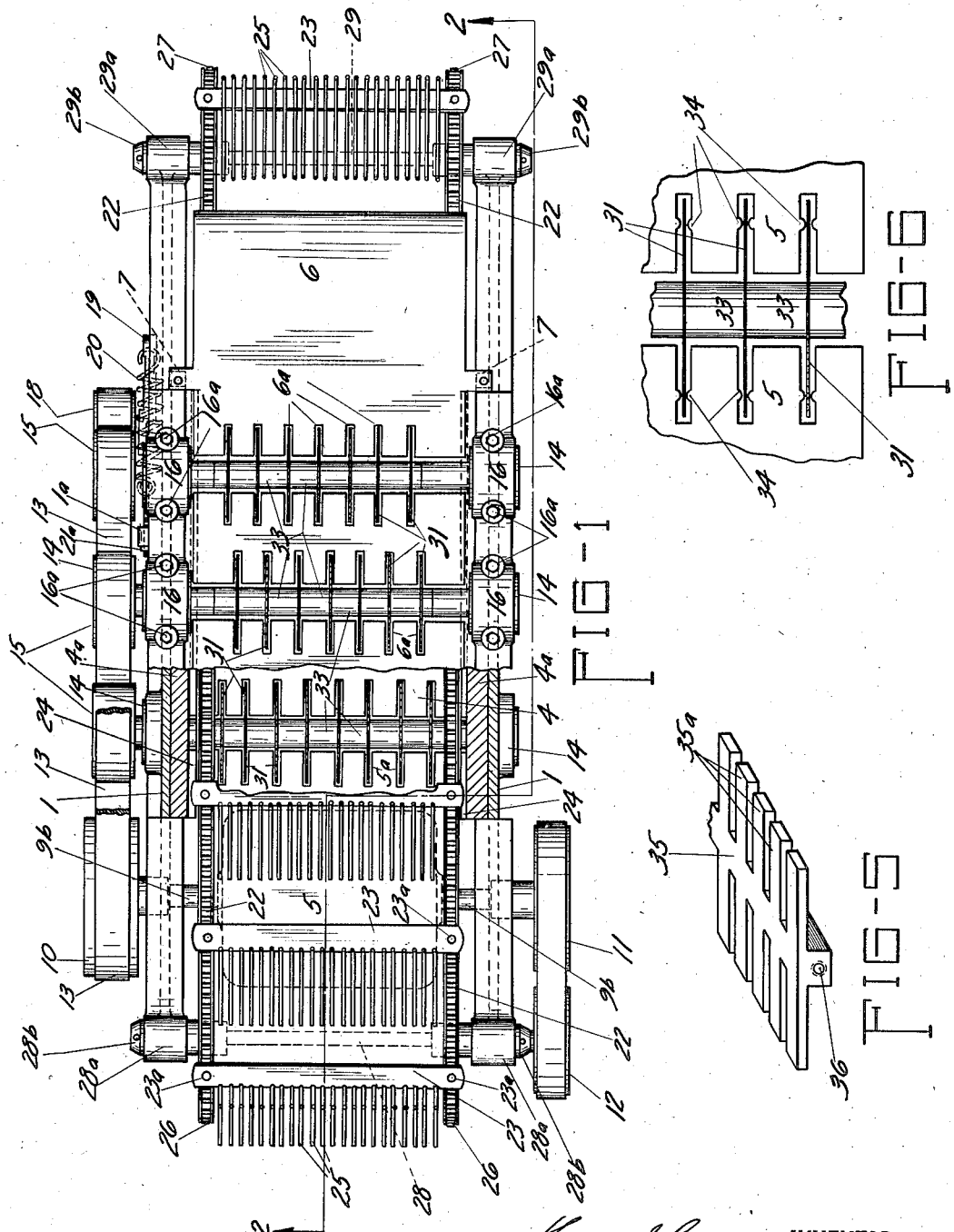
INVENTOR.

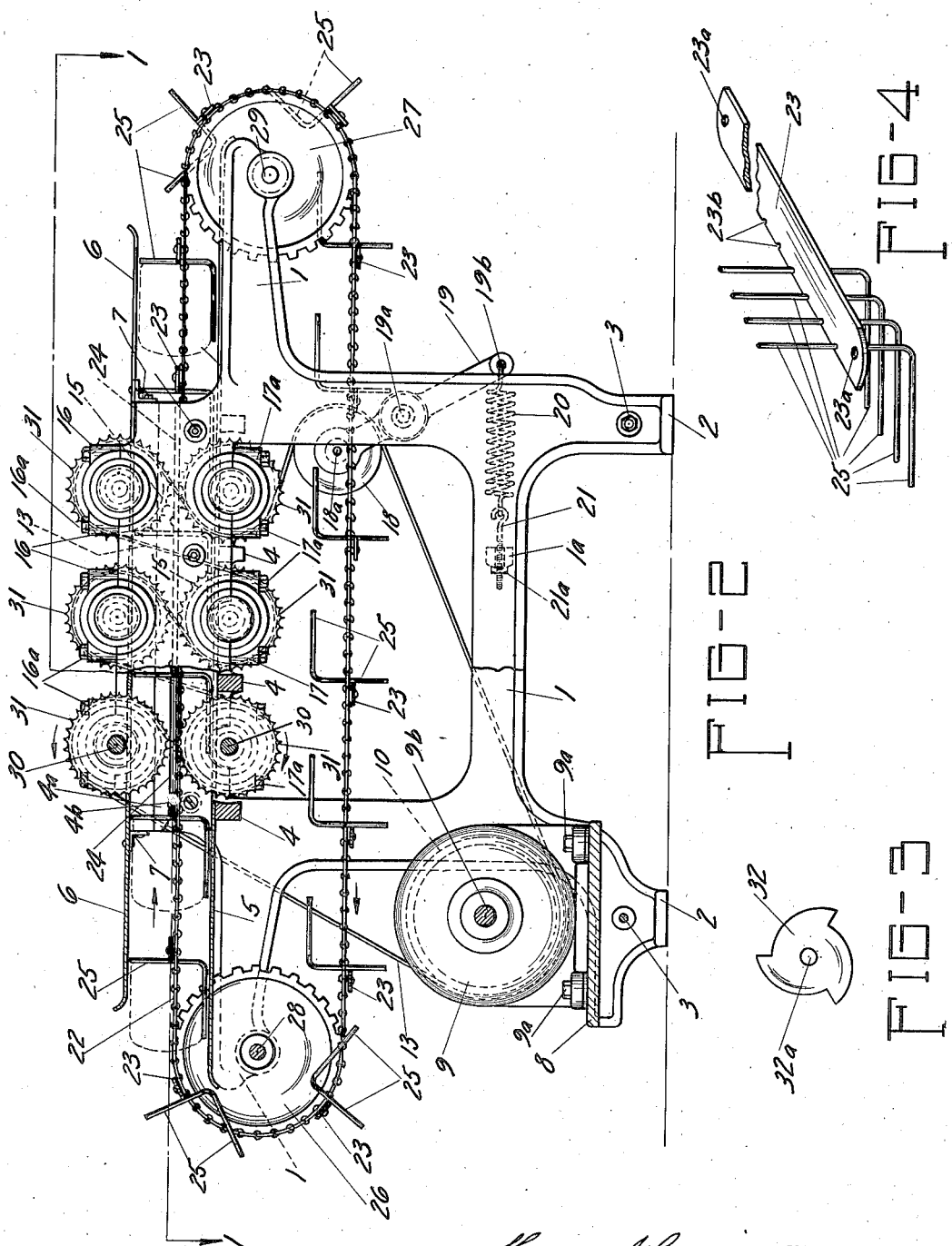

June 23, 1936.    H. J. CRINER    2,044,835
BREAD SLICING MACHINE
Filed Feb. 16, 1931    3 Sheets-Sheet 3

Harry J. Criner INVENTOR.

Patented June 23, 1936

2,044,835

UNITED STATES PATENT OFFICE 2,044,835

BREAD SLICING MACHINE

Harry J. Criner, Davenport, Iowa, assignor, by mesne assignments, to The Micro Corporation, Bettendorf, Iowa, a corporation of Delaware Application February 16, 1931, Serial No. 516,065

20 Claims. (Cl. 146—98)

My invention relates to improvements in bread slicing machines.

The objects of my invention are:

1. To provide a bread slicing machine of the rotary type having feeding means which will feed the successive loaves of bread steadily and regularly to and through the cutters and which will prevent displacement and distortion or tearing of the loaves being sliced;

2. To provide improved means for restraining the forward movement of the bread through the cutters during the slicing operation while the cutters are revolving in the direction in which the bread is traveling;

3. To provide an improved bread carrier to carry the loaves of bread to and through the cutters;

4. To provide means in a rotary bread slicing machine which will permit the use of very thin cutters and which will prevent wabbling and distortion of such cutters;

5. To provide guides which will prevent bending and distortion of the cutters;

6. To provide means which will insure regular, accurate, even slicing of the loaves.

I accomplish these objects by the means illustrated in the accompanying drawings, in which,—

Figure 1 is a plan view of my machine showing the left half of the machine in section on the line 1—1 of Figure 2;

Figure 2 is a side elevation of my machine, but showing the left half in section on the line 2—2 of Figure 1;

Figure 3 is a side view of an alternate form of cutter;

Figure 4 is an enlarged detail of one form of bread carrier;

Figure 5 is an enlarged detail of one form of carrier support and cutter guide;

Figure 6 is an enlarged detail showing an alternate form of construction for the carrier support;

Figure 7:
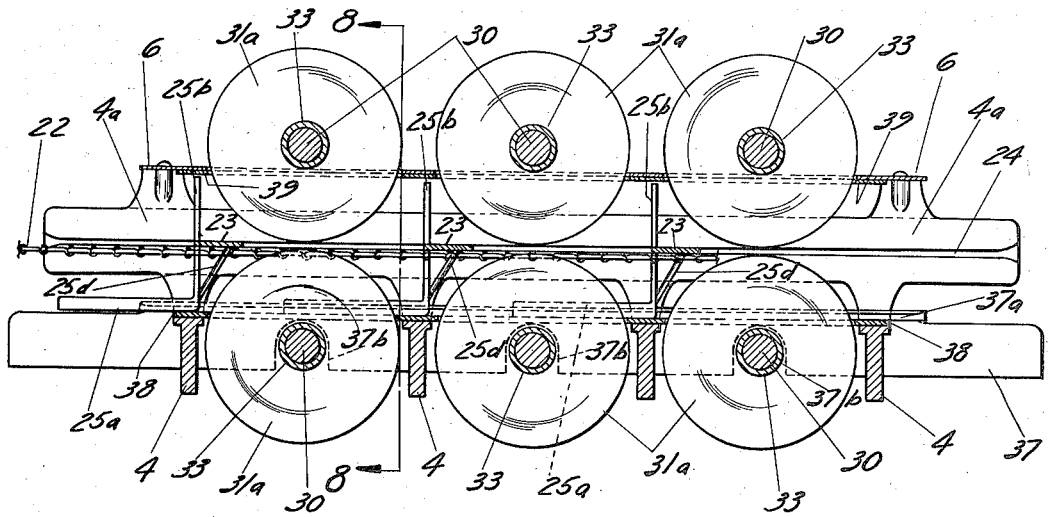
Figure 7 is an enlarged detail cross-section on the line 7—7 of Figure 8 and shows an alternate form of support and guide for the bread carrier.

My machine comprises main side frame, 1, having feet, 2, formed integral therewith. Tie-rods, 3, unite the side frames. Cross-bars, 4 are united to the side frames and extend transversely of the machine and form a support for the lower table, 5, and may be formed integral with the table, 5, if desired.

Longitudinal slots, 5a, are formed in the table, 5. Lateral extensions, 4a, are formed integral with the crossbars, 4, or with the table, 5, when the table is formed integral with the crossbars, and these side extensions, 4a, are secured to the side frames by bolts, 4b, or other suitable means and the extensions are provided with longitudinal grooves, 24, in which the cross-members of the bread carriers hereinafter described, slide longitudinally of the machine.

A plurality of shafts, 30, preferably arranged in vertical pairs, are mounted transversely of the machine in bearings, 14, secured to the side frames by upper and lower bearing caps, 16 and 17, the caps being secured to the side frames by bolts, 16a and 17a, or other suitable means.

Pulleys, 15, are united to the shafts and carry a belt, 13, by which they are driven and the belt, 13, is driven by a drive pulley, 10, secured upon the shaft, 9b, of the motor, 9, which is mounted upon the frame and secured thereto by bolts, 9a. A belt tightener, 18, is mounted upon a shaft, 18a, which is revolvably mounted in one end of the lever, 19, pivotally mounted upon a shaft, 19a, and the opposite end of the lever, 19, has attached to it one end of a tension spring, 20, the opposite end of which is united to a tightener, 21, secured to a lug, 1a, formed integral with the frame, by the nut, 21a.

An upper table, 6, extends longitudinally of the machine just below the upper cutter shafts and is secured upon brackets, 7, united to the side frames by rivets or other suitable means. The table, 6, is provided with a plurality of slots, through which the upper cutters, 31, project downwardly. The upper and lower shafts, 30, are so spaced as to leave a slight space between opposed cutters wide enough to permit the passage of the bread carrier bars, 23, between opposed sets of cutters.

The carrier bars, 23, are united at each end to flight chains, 22, which travel longitudinally of the machine and are driven by front sprocket wheels, 26, and rear sprocket wheels, 27, which are mounted upon sprocket shafts, 28 and 29. The sprocket shafts are mounted in bearings, 28a and 29a, respectively mounted in the side frames with collars, 28b and 29b, to secure the shafts in the bearings. The grooves, 24, extend longitudinally of the machine parallel with and slightly above the path of the upper flight of chains, 22, and the cross-members, 23, are held in and guided by these grooves, 24.

To the cross-members, 23, I rigidly secure angle rods, 25, the vertical arms of which are a little longer than the height of an ordinary loaf of bread and the horizontal arms of which are a little longer than the thickness of an ordinary loaf of bread. To unite these angle rods, 25, firmly to the cross-members, 23, I prefer to cut or drill openings, 23b, therein which fit the bars, 25, closely, and to braze the rods to the cross-members, 23, so that they are held rigidly against turning.

The angle rods, 25, are preferably made of steel plated with some rust-proof plating and must be small enough to pass readily between the adjacent cutters as hereinafter described, without coming in contact therewith.

Upon each of the shafts, 30, I mount a plurality of cutters or knives, 31, with spacers, 33, to space them apart the proper distance to cut slices of the desired thickness. Slots, 6a and 5a, are formed respectively in the upper and lower tables, 6 and 5, through which the cutters may extend. The cutters are preferably made circular in form with teeth around the periphery formed by cutting out concave portions of the disc around the periphery thereof and sharpening the teeth and concave portions on both sides of the disc.

An alternate form of cutter, 32, is shown in Figure 3 mounted upon the shaft, 32a, which will give a knifelike action when run at slow or moderate speed, but I do not limit my invention to any particular form of cutting edges or teeth, as it is obvious that these may be varied to a large extent.

I prefer to form my cutters of sheet steel of from ten to fifteen thousandths of an inch in thickness, as cutters of this thickness will avoid jamming or packing the bread in cutting and thus prevent crushing or distortion of the loaves. As a further protection against crushing and distortion, the cutters are arranged as shown in a plurality of series so that the cutters on the second and each subsequent pair of shafts, will travel in a different path than the cutters upon the first or any preceding pair of shafts.

The slots, 6a and 5a, are preferably formed of a width but slightly exceeding the thickness of the cutters so that the sides of the slots will act as guides to prevent the cutters from bending and avoid distortion thereof. A clearance of two or three thousandths of an inch on each side of the cutters has been found sufficient to allow them to run freely and to secure them against distortion.

The tables, 5 and 6, may be either continuous sheets of metal extending substantially the length of the machine, or they may be formed in a number of separate sections as shown in Figure 5, and the slots may be formed either with uniformly straight sides or with small portions, 34, of the plates or tables, 5 and 6, extending into the slots on opposite sides of the cutters, to act as guides for the blades and these projecting portions, 34, may be either formed integral with the plates, 5 and 6, or may be in the form of separate pieces suitably united thereto and by forming them of separate pieces, they may be made adjustable.

Figure 8:
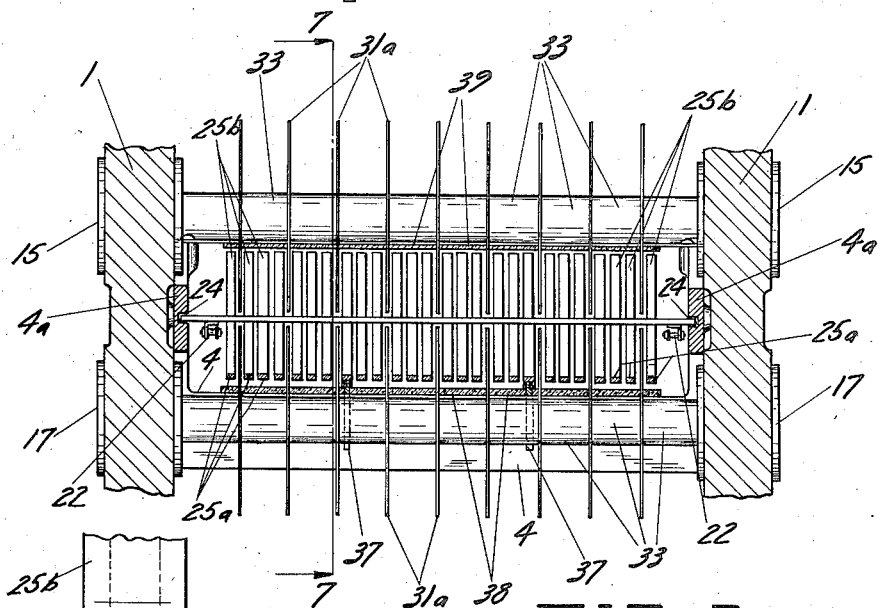
Figure 8 is an enlarged cross-sectional detail on the line 8—8 of Figure 7 showing the same alternate form of construction as Figure 7.
Figure 9:
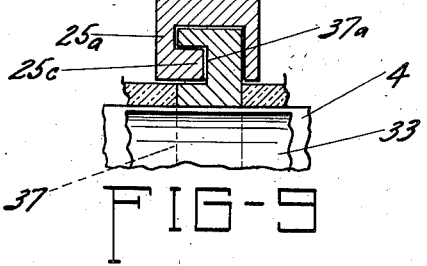
Figure 9 is a greatly enlarged cross-sectional detail of the alternate form of L or angle rods used to support and guide the bread carrier.

It is obvious that for ordinary purposes the table, 5, will afford a sufficient support for the horizontal arms of the L or angle rods, 25, and the crossbars, 23, but in order to secure a somewhat firmer support for the crossbars, 23, I provide in Figures 7, 8 and 9, an alternate form of L or angle rods, 25, in which the horizontal arms, 25a, are grooved on the under side, with grooves, 37a, which enable them to slide longitudinally upon the supporting bars, 37, the upper edge of which is formed with a channeled head which fits the groove in the arm, 25a, snugly, and not only forms a support for it, but also prevents it from becoming displaced upwardly.

At least two of these grooved arms, 25a, and channeled supports should be used with the channels turned in opposite directions so as to aid in preventing lateral displacement of the bread carrier, but a larger number may be used if desired.

Where this alternate form of construction is used, it is not necessary to have the vertical arms, 25b, extend so close to the top table or plate, 6, as would otherwise be necessary, and by reducing the number of such supports, the drag of the carrier may be reduced with corresponding advantages.

The grooves, 37a, are enlarged at their ends to afford free entrance of the arms, 25a, at that point.

In the operation of my machine, the bread is placed upon the front or left carrier as shown in Figure 2, resting upon the horizontal arms of the angle rods, 25, and against the vertical arms thereof. The loaves of bread may be placed upon the carriers in a position necessary to present the desired portion—top, bottom or side of the loaf— to the cutters and as the carriers travel from left to right, the bread is carried to the cutters. The cutters rotate toward each other from the left so that the action of the cutters tends to draw the bread into the machine and hold it tightly against the vertical arms of the angle rods, 25, while these vertical arms act to detain the bread from being carried too rapidly through the cutters or from being displaced. The upper and lower plates, 6 and 5, are spaced so as to give just sufficient clearance of the carriers to permit easy travel thereof and to prevent any material displacement of the carriers, as well as prevent any material bending of the cross-members, 23, and this form of construction will permit the use of a flat, thin cross-member, 23, and permit a correspondingly closer adjustment of the opposed sets of cutters.

When conveyors are used in which upstanding arms or prongs are used to press or force the bread against the cutters, and the cutters are revolved towards such prongs, there is a tendency to compress and distort the loaves of bread and this tendency frequently results in the loaves being crushed to such an extent as to impair the shape and the looks of the loaf and of the individual slices and this pressure also at times results in compacting the loaf to such an extent that it will be torn or ruptured instead of being sliced, resulting in the entire distortion of the loaf.

My apparatus obviates this difficulty because there is nothing to force the loaves of bread against the cutters. The upstanding set of arms connected to each crossbar moves in advance of the horizontal arms united thereto. The bread rests lightly upon the horizontal arms and as the cutters revolve in the direction in which the bread is moving, as shown by the arrows in Figure 2, the bread is carried forward by the action of the cutters and the upstanding arms act as a detent to prevent the bread from moving any faster than the carrier.

It will be noted that the upstanding arms take no part in forcing the bread against the cutters in the first instance, but merely act as detents to prevent the bread being carried forward by the cutters in advance of the carriers. Thus my arrangement does away with any tendency to jam or impact the loaves of bread in case the cutters happen to be dull or do not cut smoothly, for the bread will not be carried forward any faster than the cutters cut it.

In the machines heretofore in use, difficulty has sometimes been experienced due to the bread becoming displaced while being fed to and through the rotary cutters. In my apparatus, this difficulty is abrogated because the bread is carried on the horizontal arms of the angle rods, 25, or 25a, which are supported and guarded against displacement downwardly not only by the crossbars, 23, but also by the lower table, 25, or supporting members, 35, or 37a, while the bread is prevented from being displaced upwardly by the upper table or guide plate, 6. Where the cutter rolls are revolved in the direction in which the bread is traveling, there is a tendency for the bread to be carried through too rapidly and torn or cut unevenly and I obviate this tendency in my machine by the use of the vertical arms of the L-rods, 25, as shown in the alternate form illustrated in Figure 9.

It is obvious that various equivalents may be used for different parts of my apparatus and I do not limit my claims to the precise construction shown herein.

I claim:

1. A bread slicing machine comprising a frame, a plurality of parallel spaced pairs of shafts mounted in the frame, a series of thin, circular cutters mounted upon each cutter shaft and spaced apart thereon, the corresponding cutters upon each shaft of each pair of shafts being coplanar and spaced apart, and the cutters of each succeeding series being offset with relation to each preceding series, a lower table mounted upon the frame above the lower cutter shafts, an upper table mounted upon the frame below the upper cutter shafts, narrow slots formed in the tables through which the cutters of the adjacent shafts project, the side of the slots acting as guides to prevent bending or distortion of the cutters, means for rotating the cutters, and means for carrying the loaves to be sliced between the tables and to and through the cutters.

2. A bread slicing machine comprising a frame, a plurality of parallel spaced pairs of shafts mounted in the frame, a series of thin cutters mounted upon each cutter shaft and spaced apart thereon, the corresponding cutters upon each shaft of each pair of shafts being coplanar and spaced apart, and the cutters of each succeeding series being offset with relation to each preceding series, a lower table mounted upon the frame above the lower cutter shafts, an upper table mounted upon the frame below the upper cutter shafts, narrow slots formed in the tables through which the cutters of the adjacent shafts project, means for rotating the cutters, and means for carrying the loaves to be sliced between the tables and to and through the cutters.

3. A bread slicing machine comprising a frame, a plurality of parallel spaced pairs of shafts mounted in the frame, a series of thin cutters mounted upon each cutter shaft and spaced apart thereon, the corresponding cutters upon each shaft of each pair of shafts being coplanar and spaced apart, and the cutters of each succeeding series being offset with relation to each preceding series, lower supports mounted upon the frame above the lower cutter shafts, upper guides mounted upon the frame below the upper cutter shafts, cutter guides united to the lower supports and upper guides adjacent the cutters and on each side thereof adapted to prevent bending or distortion of the cutters, means for rotating the cutters and means for carrying the loaves to be sliced between the tables and to and through the cutters.

4. A bread slicing machine comprising a frame, a plurality of parallel spaced pairs of shafts mounted in the frame, a series of thin cutters mounted upon each cutter shaft and spaced apart thereon, the corresponding cutters upon each shaft of each pair of shafts being coplanar and spaced apart, and the cutters of each succeeding series being offset with relation to each preceding series, lower supports mounted upon the frame above the lower cutter shafts, upper guides mounted upon the frame below the upper cutter shafts, means for rotating the cutters and means for carrying the loaves to be sliced between the tables and to and through the cutters.

5. A bread slicing machine comprising a frame, a plurality of parallel spaced pairs of shafts mounted in the frame, a series of thin, circular cutters mounted upon each cutter shaft and spaced apart thereon, the corresponding cutters upon each shaft of each pair of shafts being coplanar and spaced apart, and the cutters of each succeeding series being offset with relation to each preceding series, a lower table mounted upon the frame above the lower cutter shafts, an upper table mounted upon the frame below the upper cutter shafts, narrow slots formed in the tables through which the cutters of the adjacent shafts project, the sides of the slots acting as guides to prevent bending or distortion of the cutters, carriers for carrying the loaves to be sliced between the tables and to and through the cutters, the lower table acting to support the carriers while carrying a loaf through the cutters and the upper table acting to prevent the bread and carriers from being displaced upwardly while passing through the cutters, means to drive the carriers and means to rotate the cutter shafts.

6. A bread slicing machine comprising a frame, a plurality of parallel spaced pairs of shafts mounted in the frame, a series of thin, circular cutters mounted upon each cutter shaft and spaced apart thereon, the corresponding cutters upon each shaft of each pair of shafts being coplanar and spaced apart, and the cutters of each succeeding series being offset with relation to each preceding series, a lower table mounted upon the frame above the lower cutter shafts, an upper table mounted upon the frame below the upper cutter shafts, narrow slots formed in the tables through which the cutters of the adjacent shafts project, side bars united to the frame extending longitudinally thereof, grooves formed upon the inner faces of the side bars, sprocket shafts mounted in the frame at each end thereof, a pair of sprocket wheels mounted upon each sprocket shaft, a pair of sprocket chains carried upon the sprocket wheels at opposite sides of the frame, crossbars mounted upon the chains, with their ends entering and guided by the grooves at each revolution of the chains, a plurality of angle rods rigidly united to each crossbar, each angle rod having a transverse arm and a forwardly extending arm at right angles to the transverse arm, and means for simultaneously driving the cutter shafts and the sprocket wheels.

7. A feeding appliance for rotary bread slicing machines having a frame and a plurality of opposed coplanar cutting members mounted therein, comprising grooved side bars united to the frame, crossbars adapted to slide in the grooves and between the opposed coplanar cutters, sprocket chains united to the crossbars, sprocket shafts revolvably mounted in the frame, sprocket wheels mounted upon the sprocket shafts, and carriers united to the crossbars formed of a plurality of angular rods each having one vertical arm extending transversely of the crossbar when in loaded position and rigidly secured thereto and one horizontal arm at right angles to the transverse arm and extending rearwardly therefrom, and means to drive the sprocket shafts.

8. In a feeding appliance for multiple-bladed rotary bread slicing machines having a plurality of opposed coplanar cutters, the combination with a pair of sprocket wheels at each end of the machine, of sprocket chains mounted thereon, a plurality of crossbars mounted upon the sprocket chains, means to guide the crossbars to travel between the opposed coplanar cutters, a plurality of L-shaped rods rigidly secured to each of said crossbars and extending above and below same, and means to actuate the sprocket wheels.

9. In a feeding appliance for multiple-bladed rotary bread slicing machines having a plurality of opposed coplanar cutters, the combination with a pair of sprocket wheels at each end of the machine, of sprocket chains mounted thereon, a plurality of crossbars mounted upon the sprocket chains, means to guide and support the crossbars and cause them to travel between said coplanar cutters, a plurality of L-shaped rods rigidly secured to each of said crossbars, and means to actuate the sprocket wheels.

10. In a rotary bread slicing machine having side frames and a plurality of series of coplanar cutters mounted therein, a feeding appliance comprising longitudinal side bars secured to the frames, longitudinal grooves formed in the side bars, crossbars extending transversely of the machine and having their ends adapted to slide in said grooves, a plurality of L-shaped rods rigidly united to said side bars, and endless means connecting said rods for moving the same relative to said grooves and between the series of coplanar cutters.

11. In a rotary bread slicing machine having side frames and a plurality of series of cutters mounted therein, a feeding appliance comprising longitudinal side bars secured to the frames, longitudinal grooves formed in said side bars, crossbars extending transversely of the machine and having their ends adapted to slide along said grooves, a plurality of L-shaped rods having vertical arms rigidly united to said crossbars and horizontal arms at right angles thereto, a longitudinal support having a longitudinal channel formed upon the upper portion thereof and mounted in the frame intermediate the ends of the crossbars, a longitudinal groove formed in one of said horizontal arms, corresponding to and capable of interlocking with the channeled portion of said support and adapted to slide therein, and means for driving the crossbars.

12. In a rotary bread slicing machine having side frames and a plurality of series of cutters mounted therein, a feeding appliance comprising longitudinal side bars secured to the frames, longitudinal grooves formed in said side bars, crossbars extending transversely of the machine and having their ends adapted to slide along said grooves, a plurality of L-shaped rods having vertical arms rigidly united to said crossbars and horizontal arms at right angles thereto, a plurality of longitudinal supports having their upper portions channeled and mounted in the frame intermediate the ends of the crossbars, a plurality of longitudinal grooves formed in the horizontal arms, corresponding to and capable of interlocking with the channeled portions of said supports and adapted to slide therein, and means for driving the crossbars.

13. In a feeding appliance for multiple-bladed rotary bread slicing machines having a plurality of pairs of coplanar cutters, the combination with side frames, longitudinal grooves formed on the inner faces of said side frames, a conveyor having crossbars slidably mounted in said grooves adapted to travel between the pairs of coplanar cutters, and means carried by said crossbars arranged to engage and support the bread and convey it to the cutters.

14. In a feeding appliance for multiple-bladed rotary bread slicing machines having a plurality of pairs of coplanar cutters, the combination with side frames, longitudinal grooves formed on the inner faces of said side frames, a conveyor having crossbars slidably mounted in said grooves adapted to travel between the pairs of coplanar cutters, and means carried by said crossbars arranged to engage and support the bread and convey it to the cutters and to retard the bread to the rate of speed of the crossbars.

15. In a bread slicing machine, a frame, upper and lower spaced parallel shafts rotatably carried by said frame, spaced cutters mounted on each of said shafts, each cutter of one shaft being in the same plane as and being spaced from a cutter of the other shaft, an upper table carried by said frame and disposed below said upper shaft, said cutters of the upper shaft extending through said table, bread supports movable between said cutters to support loaves of bread during the slicing operation, said upper table and supports cooperating to maintain the loaves in proper slicing position, means for rotating said cutters, and means for moving said bread supports between said cutters.

16. In a bread slicing machine, a frame, upper and lower spaced parallel shafts rotatably carried by said frame, spaced cutters mounted on each of said shafts, each cutter of one shaft being in the same plane as and being spaced from a cutter of the other shaft, an upper table carried by said frame and disposed below said upper shaft, said cutters of the upper shaft extending through said table, bread supports movable between said cutters to support loaves of bread during the slicing operation, said upper table and supports cooperating to maintain the loaves in proper slicing position, means for rotating said cutters, and means for moving said bread supports between said cutters, each bread support including horizontal portions engageable with the bottoms of a bread loaf and vertical portions engageable with a side of the loaf.

17. In a bread slicing machine, a frame, upper and lower spaced parallel shafts rotatably carried by said frame, spaced cutters mounted on each of said shafts, each cutter of one shaft being in the same plane as and being spaced from a cutter of the other shaft, an upper table carried by said frame and disposed below said upper shaft, said cutters of the upper shaft extending through said table, bread supports movable between said cutters to support loaves of bread during the slicing operation, said upper table and supports cooperating to maintain the loaves in proper slicing position, means for rotating said cutters, and means for moving said bread supports between said cutters and in the direction of rotation of said cutters, each bread support including horizontal portions engageable with the bottoms of a bread loaf and vertical portions engageable with the forward side of the loaf to hold the loaf against independent forward movement during the slicing operation.

18. In a bread slicing machine, a frame, upper and lower spaced parallel shafts rotatably carried by said frame, spaced cutters mounted on each of said shafts, each cutter of one shaft being in the same plane as and being spaced from a cutter of the other shaft, an upper table carried by said frame and disposed below said upper shaft, said cutters of the upper shaft extending through said table, bread supports movable between said cutters to support loaves of bread during the slicing operation, said upper table and supports cooperating to maintain the loaves in proper slicing position, means for rotating said cutters, and means for moving said bread supports between said cutters, said last mentioned means including transverse bars connected with said bread supports and being movable through the spaces between the coplanar cutters.

19. In a bread slicing machine, a frame, upper and lower spaced parallel shafts rotatably carried by said frame, spaced cutters mounted on each of said shafts, each cutter of one shaft being in the same plane as and being spaced from a cutter of the other shaft, an upper table carried by said frame and disposed below said upper shaft, said cutters of the upper shaft extending through said table, a lower table carried by said frame and disposed above said lower shaft, said cutters of the lower shaft extending through said lower table, bread supports movable between said cutters to support the loaves of bread during the slicing operation, said upper table and supports cooperating to maintain the loaves in proper slicing position, means for rotating said cutters, and means for moving said bread supports between said cutters.

20. In combination, a cutting table having a set of spaced knives adapted to slice a body of material, and means for feeding a body of material through said knives and to the discharge end of the table, said feeding means comprising a propeller spaced above said table, and a set of spaced fingers carried by said propeller and engaging said material, and guide grooves carried by said table and engaged by said fingers to guide the ends of said fingers between said knives.

HARRY J. CRINER.